United States Patent
Zhang et al.

(10) Patent No.: US 11,360,659 B2
(45) Date of Patent: Jun. 14, 2022

(54) ELECTRONIC DEVICE, INPUT/OUTPUT APPARATUS AND METHOD THEREFOR

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Youting Zhang, Beijing (CN); Taofeng Xie, Beijing (CN); Kefeng Li, Beijing (CN); Haifeng Hu, Beijing (CN); Cui Chen, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 185 days.

(21) Appl. No.: 15/552,763

(22) PCT Filed: Jan. 24, 2017

(86) PCT No.: PCT/CN2017/072430
§ 371 (c)(1),
(2) Date: Aug. 22, 2017

(87) PCT Pub. No.: WO2017/219674
PCT Pub. Date: Dec. 28, 2017

(65) Prior Publication Data
US 2018/0267685 A1   Sep. 20, 2018

(30) Foreign Application Priority Data
Jun. 22, 2016   (CN) .......................... 201610454725.7

(51) Int. Cl.
*G06F 3/0488* (2022.01)
*G06F 3/042* (2006.01)
(Continued)

(52) U.S. Cl.
CPC .......... *G06F 3/0488* (2013.01); *G06F 1/1626* (2013.01); *G06F 3/041* (2013.01); *G06F 3/0426* (2013.01); *H04M 1/0272* (2013.01)

(58) Field of Classification Search
CPC ................ G03B 21/142; G03B 21/145; G06F 3/00–167; G06F 2203/00–04809;
(Continued)

(56) References Cited

U.S. PATENT DOCUMENTS 9,478,067 B1 * 10/2016 Worley, III ............. G06F 3/016
9,746,752 B1 *  8/2017 Yuan ...................... G03B 21/14
(Continued)

FOREIGN PATENT DOCUMENTS

CN    1577235 A    2/2005
CN  101770151 A    7/2010
(Continued)

OTHER PUBLICATIONS

Second Office Action for Chinese Patent Application No. 201610454725.7 dated Dec. 11, 2018.
(Continued)

*Primary Examiner* — Amr A Awad
*Assistant Examiner* — Aaron Midkiff
(74) *Attorney, Agent, or Firm* — Calfee, Halter & Griswold LLP

(57) ABSTRACT

An electronic device, an input/output apparatus and an input/output method therefor are disclosed. The electronic device includes an input/output controller, a first projector component, a second projector component and a detector component. The input/output controller generates a first
(Continued)

projection signal for an output interface and a second projection signal for an input interface. The first projector component projects the output interface according to the first projection signal. The second projector component projects the input interface according to the second projection signal. The detector component detects an input signal in the projected input interface, and transmits the detected input signal to the input/output controller as an input signal for the electronic device. By implementing input/output in a manner of projection, an input/output interface of a desired size is provided while the input/output apparatus of the electronic device is miniaturized.

15 Claims, 5 Drawing Sheets

(51) Int. Cl.
  *H04M 1/02* (2006.01)
  *G06F 1/16* (2006.01)
  *G06F 3/041* (2006.01)

(58) Field of Classification Search
  CPC .... G06F 1/1626; G06F 3/0426; G06F 1/1673; G06F 3/04886; G06F 1/1615; G06F 1/1639; H04M 1/0272; H04M 1/0208; H04M 1/0243; H04N 9/3141
  USPC .......................................................... 715/773
  See application file for complete search history.

(56) References Cited

U.S. PATENT DOCUMENTS

| | | |
|---|---|---|
| 2005/0012721 A1 | 1/2005 | Fong et al. |
| 2007/0063979 A1 | 3/2007 | Tran |
| 2007/0159453 A1* | 7/2007 | Inoue .................... G06F 1/1673 345/156 |
| 2007/0195294 A1* | 8/2007 | Willey ................... G03B 21/26 353/119 |
| 2007/0274710 A1* | 11/2007 | Dalby .................. H04N 5/2251 396/448 |
| 2013/0162521 A1* | 6/2013 | Lee ...................... H04N 9/3173 345/156 |
| 2014/0016105 A1 | 1/2014 | Kihara |
| 2014/0176505 A1 | 6/2014 | Arai et al. |
| 2015/0268730 A1 | 9/2015 | Walline et al. |
| 2016/0062528 A1* | 3/2016 | Bowers ................. G06F 3/0489 345/157 |
| 2016/0070157 A1* | 3/2016 | Cheng .................. G03B 21/142 353/101 |
| 2016/0154534 A1 | 6/2016 | Xu |
| 2016/0196060 A1* | 7/2016 | Walline ................. G06F 3/0486 715/773 |
| 2016/0261834 A1 | 9/2016 | Li et al. |
| 2016/0366272 A1 | 12/2016 | Pu et al. |
| 2016/0374212 A1* | 12/2016 | Gao ....................... G06F 1/1626 |
| 2017/0075387 A1 | 3/2017 | Hou et al. |
| 2017/0363937 A1* | 12/2017 | Imai ..................... G03B 21/142 |

FOREIGN PATENT DOCUMENTS

| | | |
|---|---|---|
| CN | 103064506 A | 4/2013 |
| CN | 103812669 A | 5/2014 |
| CN | 104461004 A | 3/2015 |
| CN | 104571814 A | 4/2015 |
| CN | 104850189 A | 8/2015 |
| CN | 105117193 A | 12/2015 |
| CN | 106125923 A | 11/2016 |
| GB | 2479720 A | 10/2011 |
| JP | 11095895 A | 4/1999 |
| JP | 2006295779 A | 10/2006 |
| JP | 2009064375 A | 3/2009 |
| JP | 2014021166 A | 2/2014 |
| KR | 20030029079 A | 4/2003 |
| KR | 20080075639 A | 8/2008 |
| KR | 20150116399 A | 10/2015 |
| KR | 20150139491 A | 12/2015 |
| WO | 2015165339 A1 | 11/2015 |

OTHER PUBLICATIONS

First Office Action for Japanese Patent Application No. 2017-546969 dated Oct. 29, 2018.
Search Report for International Application No. PCT/CN2017/072430 dated May 2, 2017.
Notice of Preliminary Rejection for Korean Patent Application No. 10-2017-7024078 dated Jun. 11, 2018.
First Office Action for Chinese Patent Application No. 201610454725.7 dated May 30, 2018.
Extended Search Report for European Patent Application No. 17754589.4 dated Jan. 27, 2020.
Communication from European Patent Application No. 17754589.4 dated Nov. 23, 2021.

* cited by examiner

ELECTRONIC DEVICE, INPUT/OUTPUT APPARATUS AND METHOD THEREFOR

RELATED APPLICATION

The present application is the U.S. national phase entry of PCT/CN2017/072430, with an international filing date of Jan. 24, 2017, which claims priority of Chinese patent application No. 201610454725.7 filed on Jun. 22, 2016, the entire disclosures of which are incorporated herein by reference.

FIELD

The disclosure relates to an electronic device, an input/output apparatus and a method therefor.

BACKGROUND

With the rapid development of the electronic technology and the computer technology, etc., electronic devices have more various functions and are able to provide more services. A conventional electronic device such as a notebook computer, a tablet computer and the like generally implements interaction with a user through an input/output apparatus such as a display screen and a keyboard etc. The size of an input/output interface for interaction is generally dependent on the actual size of the screen and the keyboard. Because the screen and the keyboard normally have certain volumes and cannot be bent, an electronic device with a large screen and a keyboard generally occupies relatively large space. If the electronic device is equipped with small sizes of screen and keyboard, the area of input/output interface will be reduced, which may bring problems like less content being rendered or user operation becoming inconvenient.

SUMMARY

An object of the disclosure is to provide an electronic device, an input/output apparatus and a related method, which mitigates or alleviates the above problems.

According to an exemplary embodiment of the disclosure, an electronic device is provided. The electronic device comprises an input/output controller, a first projector component, a second projector component and a detector component. The input/output controller is configured to generate a first projection signal for an output interface and a second projection signal for an input interface. The first projector component is configured to project the output interface according to the first projection signal. The second projector component is configured to project the input interface according to the second projection signal. The detector component is configured to detect an input signal in the projected input interface, and transmit the detected input signal to the input/output controller as an input signal for the electronic device.

In some exemplary embodiments, the electronic device further comprises a connector mechanism, which is configured to connect the first projector component and the second projector component. The connector mechanism enables the first projector component and the second projector component to rotate relative to each other, so as to change a relative projection direction of the projected output interface with respect to the projected input interface.

In some exemplary embodiments, the electronic device has multiple operating modes. The connector mechanism is configured to automatically rotate at least one of the first projector component and the second projector component according to an operating mode selected from the multiple operating modes so as to project the output interface and the input interface according to a corresponding relative projection direction.

In some exemplary embodiments, the connector mechanism is configured to connect the first projector component and the second projector component in an axial direction thereof, and to switch between an unlocked state that enables relative rotation between the first projector component and the second projector component and a locked state that disables the relative rotation therebetween based on a change of a relative position of the first projector component with respect to the second projector component in the axial direction.

In some exemplary embodiments, the electronic device further comprises an ambient light sensor module. The ambient light sensor module is configured to sense ambient light brightness of the ambient where the electronic device locates, the sensed ambient light brightness being used for adjusting a projection parameter of the first projector component and the second projector component.

In some exemplary embodiments, the electronic device further comprises a touch control sensor module. The touch control sensor module is configured to sense strength of user touch in a preset touch area, the sensed strength being used for adjusting a projection parameter of the first projector component and the second projector component.

In some exemplary embodiments, the electronic device further comprises a fingerprint identification area. The fingerprint identification area is configured to obtain a fingerprint of a user of the electronic device, and authenticate the user based on the fingerprint of the user.

In some exemplary embodiments, the input/output controller is configured to generate a second projection signal based on an application currently running on the electronic device, and the second projector component is configured to project an input interface adapted to the application currently running on the electronic device based on the second projection signal.

In some exemplary embodiments, the input interface is a virtual keyboard or a virtual control panel for use by the electronic device, and the output interface is a virtual screen for use by the electronic device.

According to an exemplary embodiment of the disclosure, an input/output method for use in an electronic device is further provided. The method comprises: generating a first projection signal for an output interface and a second projection signal for an input interface; projecting the output interface according to the first projection signal through a first projector component; projecting the input interface according to the second projection signal through a second projector component; detecting an input signal in the projected input interface as an input signal for the electronic device.

In some exemplary embodiments, the method further comprises: relatively rotating the first projector component and the second projector component through a connector mechanism that connects the first projector component and the second projector component, so as to change a relative projection direction of the first projector component with respect to the second projector component.

In some exemplary embodiments, the electronic device has multiple operating modes, and the method comprises: automatically rotating at least one of the first projector component and the second projector component through the connector mechanism according to an operating mode selected from the multiple operating modes, so as to project the output interface and the input interface according to a corresponding relative projection direction.

In some exemplary embodiments, the method further comprises generating a second projection signal based on an application currently running on the electronic device, and projecting an input interface adapted to the application currently running on the electronic device based on the second projection signal.

According to an exemplary embodiment of the disclosure, an input/output apparatus for use with an electronic device is further provided. The input/output apparatus comprises: a communicator component, a first projector component, a second projector component and a detector component. The communicator component is configured to be communicatively connected with the electronic device, and receive a first projection signal for an output interface and a second projection signal for an input interface from the electronic device. The first projector component is configured to project the output interface according to the first projection signal. The second projector component is configured to project the input interface according to the second projection signal. The detector component is configured to detect an input signal in the projected input interface. The communicator component is further configured to transmit the detected input signal to the electronic device.

In some exemplary embodiments, the input/output apparatus further comprises a connector mechanism. The connector mechanism is configured to connect the first projector component and the second projector component, which enables the first projector component and the second projector component to rotate relative to each other, so as to change a relative projection direction of the projected output interface with respect to the projected input interface.

In some exemplary embodiments, the communicator component is configured to receive an operating mode selected from multiple operating modes from the electronic device. The connector mechanism is configured to automatically rotate at least one of the first projector component and the second projector component according to the received operating mode so as to project the output interface and the input interface according to a corresponding relative projection direction.

In some exemplary embodiments, the connector mechanism is configured to connect the first projector component and the second projector component in an axial direction thereof, and to switch between an unlocked state that enables relative rotation between the first projector component and the second projector component and a locked state that disables the relative rotation based on a change of a relative position of the first projector component with respect to the second projector component in the axial direction.

According to exemplary embodiments of the disclosure, by implementing input/output in a manner of projection, an input/output interface of a desired size is provided while the input/output apparatus of the electronic device is miniaturized. In this way, the volume of the electronic device can be further reduced while still keeping convenience in operation at the same time.

BRIEF DESCRIPTION OF THE DRAWINGS

For the skilled person in the art, these and other features and advantages of the disclosure will become more obvious by reference to the following detailed description of the embodiments of the disclosure, in conjunction the accompanying drawings.

DETAILED DESCRIPTION OF EMBODIMENTS

In the following description, certain specific details of the disclosed embodiment such as architecture, interfaces and techniques, etc., are set forth for purposes of explanation rather than limitation, so as to provide a clear and thorough understanding of the present invention. However, it should be understood readily by those skilled in this art, that the present invention may be practiced in other embodiments which do not conform exactly to the details set forth herein, without departing significantly from the spirit and scope of the disclosure. Further, in this context, and for the purpose of brevity and clarity, detailed descriptions of well-known apparatus, circuits and methodology have been omitted so as to avoid unnecessary detail and possible confusion.

Figure 1:
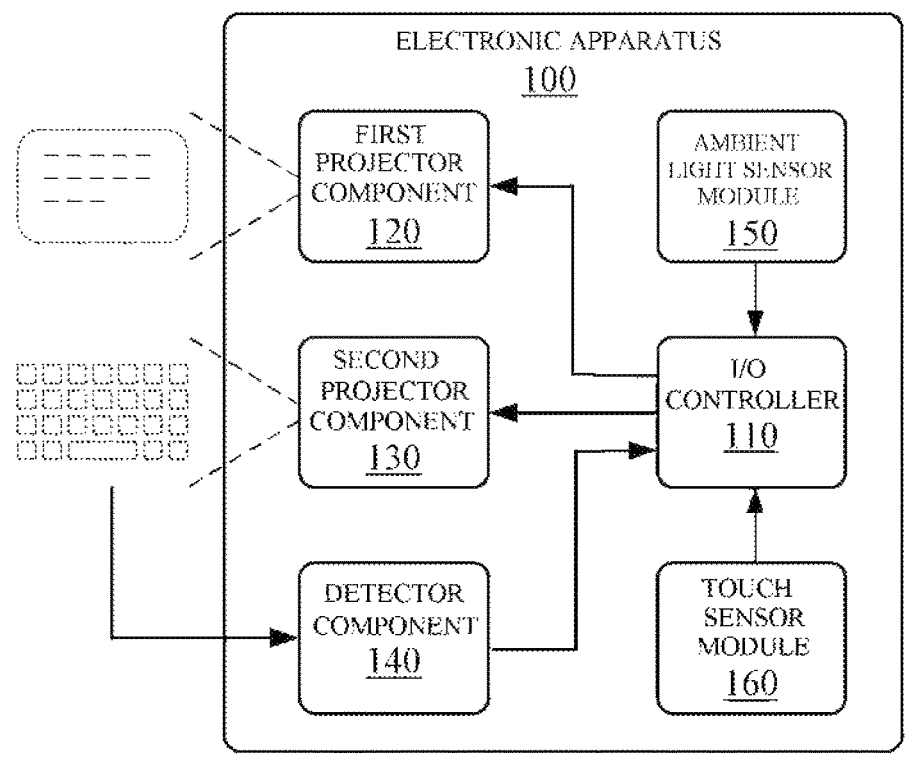
FIG. 1 is an exemplary block diagram that illustrates an electronic device according to an embodiment of the disclosure.

FIG. 1 shows an exemplary block diagram of an electronic device 100 according to an embodiment of the disclosure. The electronic device may be a device configured in various ways. For example the electronic device 100 may be a computer, a mobile device (such as a mobile station, a mobile phone, a personal digital assistant (PDA)), a consumer electronic device (such as an entertainment apparatus, a game console) etc. In some embodiments, the electronic device 100 is a portable electronic device.

The electronic device 100 comprises an input/output (I/O) controller 110, a first projector component 120, a second projector component 130 and a detector component 140. These components may be operatively coupled with each other.

The I/O controller 110 is configured to generate a first projection signal for an output interface of the electronic device and a second projection signal for an input interface of the electronic device. The output interface is for rendering the content outputted by the electronic device 100, for example, visual elements such as texts, images, windows and so on, which are generated and/or managed by one or more of applications running on the electronic device 100. The input interface is for rendering an input interface for the electronic device 100 to receive inputs (such as commands and information). In some embodiments, the I/O controller 110 can generate the first and second projection signals based on an operating state of the electronic device and/or an application currently running on the electronic device. Examples of the application include a browser application, a word processing application, a game application, a video player application, etc.

The first projector component 120 and the second projector component 130 are coupled to the I/O controller 110 to receive the first projection signal and the second projection signal. The first projector component 120 is configured to project the output interface for the electronic device 100 according to the first projection signal, while the second projector component 130 is configured to project the input interface for the electronic device 100 according to the second projection signal. Optionally, the output interface may be projected on e.g. a wall or a suspended projection curtain, while the input interface may be projected on a desktop, particularly at a position where it is convenient for a user to operate on. In some embodiments, the output interface and the input interface may be used with a preset touch panel, for example being projected on a corresponding touch panel.

In some embodiments, the first projector component and the second projector component can project an output interface and an input interface that is adapted to an operating state of the electronic device based on the first and second projection signals. For example, when the electronic device 100 is in an operational state, the first projection signal can be used to control the first projector component 120 to project the output interface as a virtual screen for rendering content, and the second projection signal can be used to control the second projector component 130 to project the input interface as an input interface that can be employed to manipulate the rendered content, e.g., a virtual keyboard or a virtual control panel. When the electronic device 100 is in a sleep state, the first projection signal and the second projection signal can control the first projector component 120 and the second projector component 130 to be turned off. By allowing projection of the output interface and the input interface to change with operating states of the electronic device, the purpose of saving power may be achieved.

In some embodiments, the first projector component and the second projector component can project an output interface and an input interface adapted to the application currently running on the electronic device based on the first and second projection signals. In an example, when the electronic device 100 runs a conventional word processing application or a browser application, the input interface may be projected as e.g. a conventional desktop keyboard or a laptop keyboard. In another example, when the electronic device runs a game application or executes a particular task, the input interface may be projected as a dedicated game keyboard or a keyboard with keys dedicated to the task. In a further example, when the electronic device runs a video player application, the input interface may be projected as a control panel with functional keys such as play, fast-forward, backward, pause and the like. By allowing projection of the input interface to change with applications running on the electronic device, user friendliness of the electronic device is further enhanced.

The detector component 140 is configured to detect an input signal in the projected input interface, and transmit the detected input signal to the I/O controller 110 as an input signal for the electronic device. In some embodiments, the detector component 140 can perform said detection using the infrared technology. For example, the detector component 140 can comprise an infrared sensor to track action of a touch object (e.g., a finger(s) of a user) in the projected input interface, so as to realize said detection.

The I/O controller 110 can, upon receipt of an input signal from the detector component 140, change or regenerate the first projection signal and/or the second projection signal based on the input signal, so as to enable the projected output interface and/or input interface to respond to the input signal.

According to embodiments of the disclosure, by implementing input/output in a manner of projection, an input/output interface of a desired size is provided while the input/output apparatus of the electronic device is miniaturized. In this way, the volume of the electronic device may be further reduced while still keeping convenience in operation. Particularly, for a portable electronic device, this enables more portability.

In an example, the first projector component and the second projector component are configured to project the output interface and the input interface according to their respective projection parameters, and the electronic device 100 further comprises an ambient light sensor module 150 that is configured to sense the ambient light brightness of the ambient where the electronic device locates. The sensed ambient light brightness is used for adjusting projection parameters of the first projector component and the second projector component. In some embodiments, the ambient light sensor module 150 is coupled to the I/O controller 110, and can transmit the sensed ambient light brightness to the I/O controller 110. The I/O controller 110 can generate a corresponding projection signal based on the received ambient light brightness to adjust the projection parameters for the first projector component and the second projector component. Alternatively, the ambient light sensor module 150 is coupled to the first projector component and the second projector component, and can transmit the sensed ambient light brightness to the first projector component and the second projector component. The first projector component and the second projector component can adjust their projection parameters accordingly based on the received ambient light brightness. In some embodiments, the projection parameters may be projection brightness, and the I/O controller 110 may be configured to increase the projection brightness when the ambient light brightness is relatively high.

By allowing the projection parameters of the projector components to be adapted to ambient light brightness of the ambient where the electronic device locates, the projection quality of the input/output interface is further improved.

In another example, the first projector component and the second projector component are configured to project the output interface and the input interface according to their respective projection parameters, and the electronic device 100 further comprises a touch control sensor module 160 that is configured to sense strength of user touch in a preset touch area. The sensed strength is used for adjusting the projection parameters of the first projector component and the second projector component. In some embodiments, the touch control sensor module 160 is coupled to the I/O controller 110, and can transmit the sensed strength to the I/O controller 110. The I/O controller 110 can generate a corresponding projection signal based on the received strength to adjust the projection parameters of the first projector component and the second projector component. Alternatively, the touch control sensor module 160 is coupled to the first projector component and the second projector component, and can transmit the sensed strength to the first projector component and the second projector component. The first projector component and the second projector component can adjust the projection parameters of the first projector component and the second projector component correspondingly based on the received strength. The projection parameters may be for example the resolution of the projected input interface and/or output interface. In some embodiments, the touch control area is set to be in the form of keys, and the touch control sensor module can sense the strength of the user pressing the keys. By further distinguishing different characteristics of a single touch and performing projection control based on the characteristics, convenience for a user to manipulate the electronic device is further enhanced.

Figure 2A:
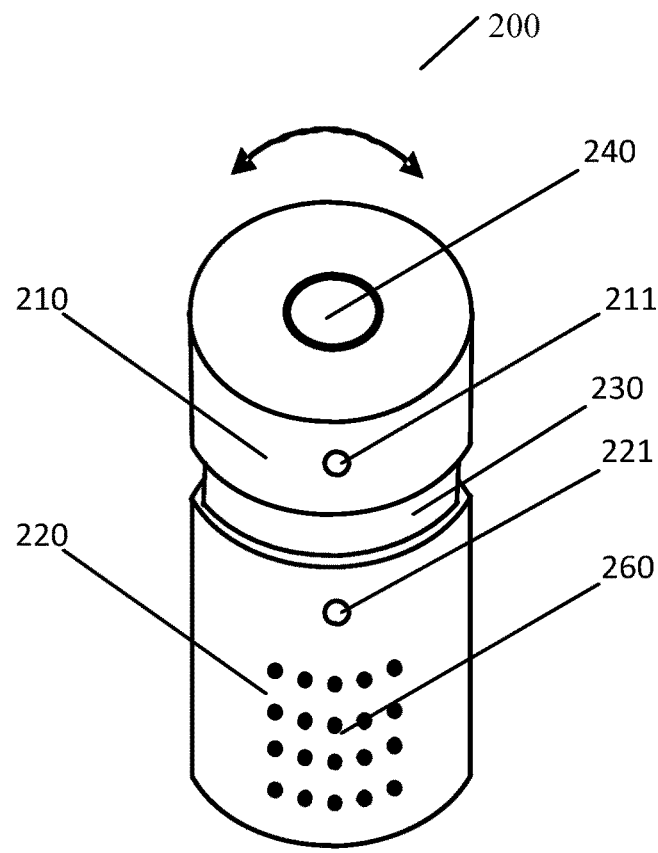
FIG. 2a and FIG. 2b illustrate an exemplary electronic device according to an embodiment of the disclosure.
Figure 2B:
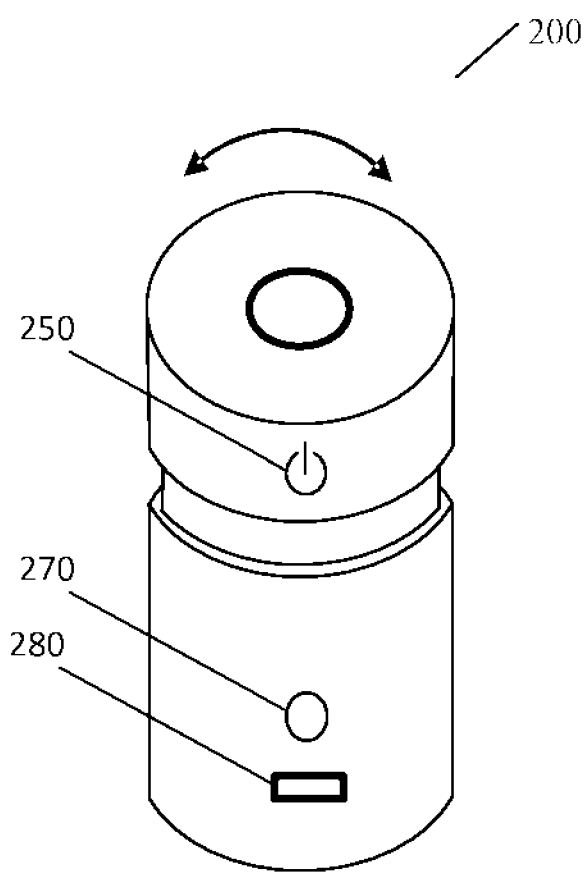

FIG. 2a and FIG. 2b illustrate an exemplary electronic device 200 according to an embodiment of the disclosure. FIG. 2a shows a front view of the electronic device 200, and FIG. 2b shows a back view of the electronic device 200. The electronic device 200 can comprise one or more components as described in FIG. 1. In FIG. 2a, the body of the electronic device 200 is divided into a first part 210 and a second part 220. The first projector component (e.g., the first projection lens) 211 may be arranged in the first part 210, and the second projector component (e.g., the second projection lens) 221 may be arranged in the second part 220. In some embodiments, the first projector component 211 can project an output interface for the electronic device in any plane, so as to for example present a virtual screen, and the second projector component 221 can project an input interface for the electronic device in any plane, so as to for example present a virtual keyboard or a virtual control panel.

The electronic device 200 is further illustrated as comprising a connector mechanism 230 that connects the first part 210 and the second part 220, and thus connects the first projector component 211 and the second projector component 221. The connector mechanism 230 is configured to enable the first projector component and the second projector component to rotate relative to each other, in order to change a relative projection direction of a projected output interface with respect to a projected input interface. Optionally, the connector mechanism 230 connects the first projector component 211 and the second projector component 221 through a pivot connection, a cardan joint connection or a ball-joint connection and so on. Optionally, the relative rotation may be performed in a horizontal direction or in a vertical direction. This is benefit for the following cases. When there are multiple participants in a certain conference, the electronic device 200 may be configured to project the output interface (e.g., rendering content materials for the conference) through the first projector component 211 according to a predetermined direction, for viewed by all participants. When the electronic device 200 is required to be operated by different participants, the connector mechanism 230 may enable the second projector component to rotate by different angles relative to the first projector component, so as to project the input interface, with which the output interface may be manipulated, to respective positions of corresponding participants.

According to embodiments of the disclosure, by arranging such a connector mechanism, the relative projection direction of an input interface with respect to an output interface may be adjusted flexibly, thus increasing convenience in using the electronic device.

It may be understood that the first part 210 and the second part 220 can also be separated, and thus the first projector component and the second projector component may be positioned independently and/or their projection directions may be set separately by a user as desired.

In some embodiments, the electronic device 200 may have multiple operating modes. The operating modes may be preset therein, or alternatively, may be user-defined. Each operating mode may correspond to a usage scenario, and has its own relative projection direction of the input interface with respect to the output interface. The usage scenario may be for example a usage scenario for person or a usage scenario for conference. The connector mechanism 230 is configured to automatically rotate at least one of the first projector component and the second projector component according to an operating mode selected from the multiple operating modes so as to project the output interface and the input interface according to the corresponding relative projection direction. In some embodiments, the detector component 140 detects the operating mode selected by the user and transmits it to the I/O controller 110. The I/O controller 110 generates a control signal indicating a relative projection direction of the first projector component with respect to the second projector component based on the selected operating mode, and transmits it to the connector mechanism 230. The connector mechanism 230 rotates at least one of the first projector component and the second projector component according to the relative projection direction indicated in the control signal. In some embodiments, the I/O controller 110 may establish and store a mapping table indicative of mapping between operating modes and relative projection directions of the first projector component with respect to the second projector component. The I/O controller 110 may retrieve a corresponding relative projection direction in the mapping table based on a selected operating mode. Alternatively, the I/O controller 110 can also derive the relative projection direction of the first projector component with respect to the second projector component based on an identifier of an operating mode. For example, when the identifier of the operating mode is set as 1, 2, 3, the difference values of the relative projection directions of the first projector component with respect to the second projector component may be set to: the identifier ×30 degree, i.e., 30 degree, 60 degree, 90 degree.

For example, the electronic device 200 may have a preset personal mode corresponding to the usage scenario for person and a conference mode corresponding to the usage scenario for conference. In the personal mode, the difference between the predetermined projection directions of the first projector component with respect to the second projector component may be for example, 180 degree, i.e., the first projector component and the second projector component project the output interface and the input interface in opposite directions, for facilitating user operation. In the conference mode, the difference between the predetermined projection directions of the first projector component with respect to the second projector component may be for example 90 degree or 0 degree, i.e., the first projector component and the second projector component may project the output interface and the input interface in directions at 90 degree to each other or in same direction, for facilitating a speaker in the conference to manipulate the electronic device and for facilitating other participants in the conference to view related conference materials. By allowing the relative projection direction of the input interface with respect to the output interface to be adjusted automatically, use of the electronic device becomes more convenient.

In some embodiments, the connector mechanism 230 is configured to connect the first projector component and the second projector component in its axial direction, and may switch between an unlocked state that enables relative rotation between the two projector components and a locked state that disables the relative rotation based on a change of a relative position of the first projector component with respect to the second projector component in the axial direction. In some embodiments, the connector mechanism 230 may be designed as: if the first part 210 is depressed toward the second part 220, the position of the first part 210 is locked relative to the second part 220. When the first part 210 is raised relative to the second part 220, the first part 210 can rotate relative to the second part 220. By allowing lock of the relative position of the first projector component with respect to the second projector component, the projection stability of the input/output interface is enhanced.

In some embodiments, the electronic device 200 further comprises a fingerprint identification area 240 that is configured to obtain a fingerprint of a user of the electronic device. The user may be authenticated based on the fingerprint so as to be permitted to perform various operations. In an example, in addition to unlocking the electronic device 200 and accessing confidential document(s) within the electronic device 200 etc., the user can turn on the first projector component and the second projector component via fingerprint identification of the fingerprint identification area 240. In some embodiments, the fingerprint identification area 240 may be in the form of keys. By permitting to operate the projector components via fingerprint authentication, use of the electronic device becomes more convenient.

In addition, as shown in FIG. 2a and FIG. 2b, the electronic device 200 may further comprise other components required by its operations, for example, a power button 250 on the first part, and audio output components 260, 270 and a power charging/USB interface 280 on the second part 220.

It may be appreciated that additionally or alternatively, the electronic device 200 can further comprise other components, such as a central processing unit (CPU), storage devices, a network module, an audio and video decoding module, an audio and video output interface, a power-supply module, and other components required for its operations. However, in order to avoid confusion to the teaching of disclosure, these commonly known components are omitted.

It may be appreciated that although the electronic device 200 is shown as having a particular shape (e.g., the cylindrical shape in FIG. 2), the electronic device 200 may be manufactured into any shape or size that is suitable for and sufficient to accommodate the above components. Optionally, the electronic device 200 may be manufactured into a rectangular column shape, a pyramid shape, or even be manufactured into other shapes that might have aesthetic value.

It may be appreciated that the technologies described in this text may be applicable for any types of electronic device, and are particularly effective in a small and portable electronic device.

Figure 3:
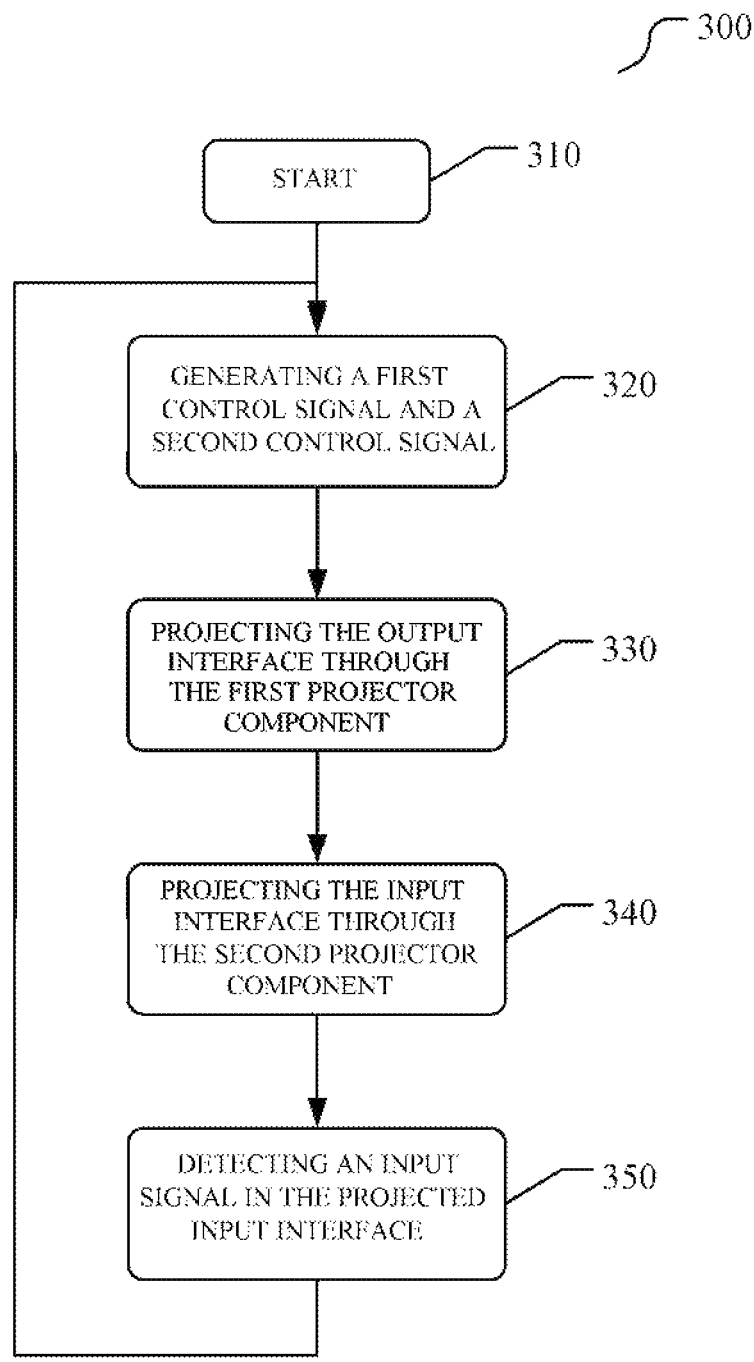
FIG. 3 is a flow chart that illustrates a method for operating an electronic device according to an embodiment of the disclosure.

FIG. 3 shows a flow chart of an input/output method 300 for use in an electronic device according to an embodiment of the disclosure. At step 310, this method starts. The start of the method may be in response to for example the electronic device is booted up or re-booted, and can also be in response to receipt of a new input signal. At step 320, a first projection signal for the output interface and a second projection signal for the input interface are generated. For example, the first projection signal and the second projection signal may be a preset input/output signal in the electronic device, which controls to render, for example, a virtual screen with a boot screen and a corresponding virtual keyboard. In some embodiments, the generated first projection signal and/or second projection signal may be adapted to an operating state of the electronic device or an application currently running on the electronic device, and/or may be changed or regenerated based on a received input signal.

At step 330, the output interface is projected by the first projector component according to the first projection signal. The output interface renders graphics outputted by the electronic device. For example, when the electronic device is running an application, the output interface renders an interface for the currently running application, for example, a webpage for a browser application or a game picture for a game application. When the electronic device is in a screen-saver status, the output interface may render no content or render only a picture for a corresponding screensaver program.

At step 340, the input interface is projected by the second projector component according to the second projection signal. The input interface renders an input interface for the electronic device to receive inputs. In some embodiments, the input interface may be adapted to an operating state of the electronic device or an application currently running on the electronic device. For example, if the electronic device is running a browser application or a word processing application thereon, the input interface may render a conventional keyboard for a personal computer. If the electronic device is running a game application, the input interface may render a game keyboard dedicated to the game application, or render one or more keys dedicated to the game program in addition to rendering the conventional keyboard for personal computer. If the electronic device is in a screen-saver status, the second projector component may be in a turn-off state and then project no input interface.

At step 350, an input signal in the projected input interface is detected as an input signal for the electronic device. For example, when the projected input interface is a virtual keyboard, the keys in the virtual keyboard are detected to determine whether they are "pressed" or not, and the obtained result of detection is used for generating an input signal.

After that, the method 300 returns back to step 320. The generated input signal is used as an input signal for the electronic device and may be used for changing or regenerating the first projection signal and the second projection signal.

According to embodiments of the disclosure, by implementing input/output in a manner of projection, an input/output interface of a desired size is provided while the input/output apparatus of the electronic device is miniaturized. In this way, the volume of the electronic device may be further reduced while still keeping convenience in operation.

In some embodiments, the method 300 further comprises relatively rotating the first projector component and the second projector component through a connector mechanism that connects the first projector component and the second projector component, in order to change a relative projection direction of the first projector component with respect to the second projector component. It may be understood that the rotation of the first projector component and the second projector component may be performed manually or automatically.

In the event that the electronic device has multiple operating modes, the method 300 comprises: automatically rotating at least one of the first projector component and the second projector component through the connector mechanism according to an operating mode selected from the multiple operating modes, so as to project the output interface and the input interface according to a corresponding relative projection direction.

According to embodiments of the disclosure, by automatically adjusting the relative projection direction of the input interface with respect to the output interface via the connector mechanism, the convenience in using the electronic device is improved.

Figure 4:
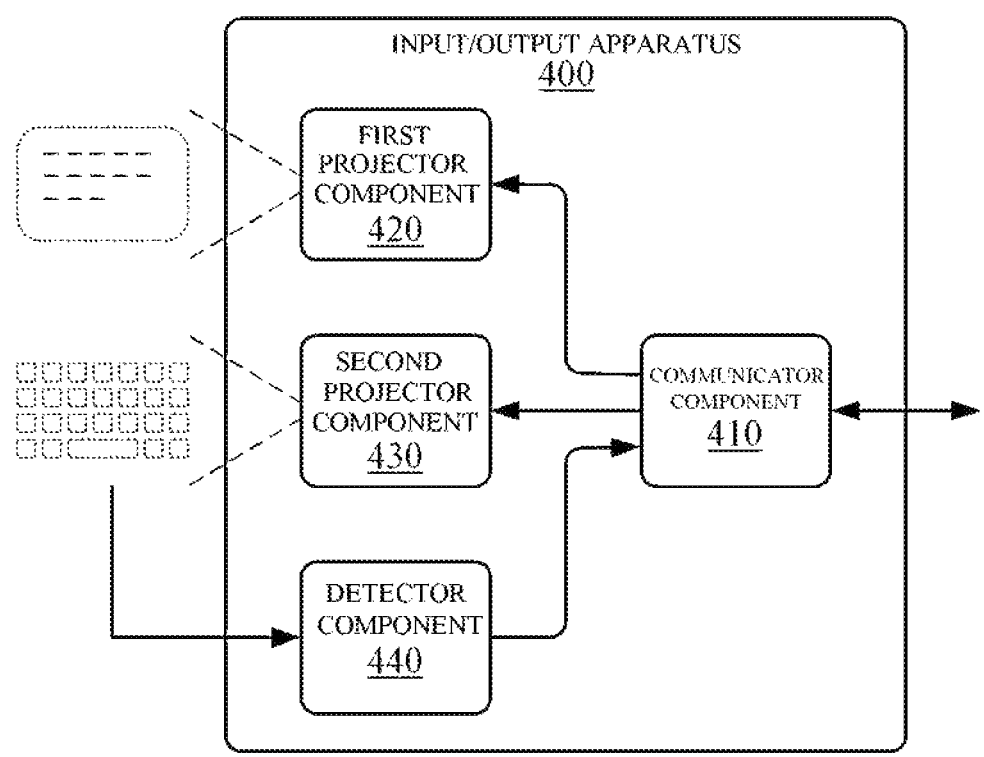
FIG. 4 is an exemplary block diagram that illustrates an input/output apparatus according to an embodiment of the disclosure.

FIG. 4 shows an exemplary block diagram of an input/output apparatus 400 according to an embodiment of the disclosure. The input/output apparatus 400 may be used with an electronic device and independent from the electronic device. The electronic device may be an existing electronic device, or an electronic device according to embodiments of the disclosure. As shown in FIG. 4, the input/output apparatus 400 comprises a communicator component 410, a first projector component 420, a second projector component 430 and a detector component 440. It may be understood that although FIG. 4 shows only these components, the input/output apparatus 400 according to embodiments of the disclosure can further comprise one or more components as described above with reference to FIG. 1 and FIGS. 2a and 2b, as well as other components required by its operations.

The communicator component 410 is communicatively connected (i.e., being connected in a communicable way) with the electronic device, to enable the input/output apparatus 400 to communicate with the electronic device. The communicator component can include but not limited to a network interface card (NIC), an integrated network interface, a RF transmitter/receiver, an infrared port, a USB connection or other interfaces for connecting the input/output apparatus to the electronic device. The communicator component 410 can support wired connection or wireless connection with the electronic device. The communicator component 410 may be configured to receive the first projection signal for the output interface and the second projection signal for the input interface from the electronic device.

The first projector component 420 is configured to project the output interface according to the first projection signal. The second projector component 430 is configured to project the input interface according to the second projection signal. The detector component 440 is configured to detect an input signal in the projected input interface.

The functions and working manners of the first projector component 420, the second projector component 430 and the detector component 440 here are similar to the corresponding components as described above with reference to FIG. 1, except that the first projector component 420, the second projector component 430 and the detector component 440 are all coupled to the communicator component 410, and they receive the first projection signal and the second projection signal from the communicator component 410 and transmit the detected input signal to the electronic device via the communicator component 410.

Similar to the electronic device described with reference to FIG. 1, the input/output apparatus 410 can comprise a connector mechanism, which is configured to connect the first projector component and the second projector component, such that the first projector component and the second projector component can rotate relative to each other, so as to change a relative projection direction of the projected output interface with respect to the projected input interface.

The communicator component 410 can receive an operating mode selected from multiple operating modes, and the connector mechanism is configured to automatically rotate at least one of the first projector component and the second projector component according to the selected operating mode so as to project the output interface and the input interface according to a corresponding relative projection direction.

The connector mechanism is configured to connect the first projector component and the second projector component in an axial direction thereof, and to switch between an unlocked state that enables relative rotation between the first projector component and the second projector component and a locked state that disables the relative rotation based on a change of a relative position of the first projector component with respect to the second projector component in the axial direction.

According to embodiments of the disclosure, by implementing input/output in a manner of projection, an input/output interface of a desired size is provided while the input/output apparatus of the electronic device is miniaturized. In this way, the volume of the electronic device may be further reduced while keeping convenience in operation.

Figure 5:
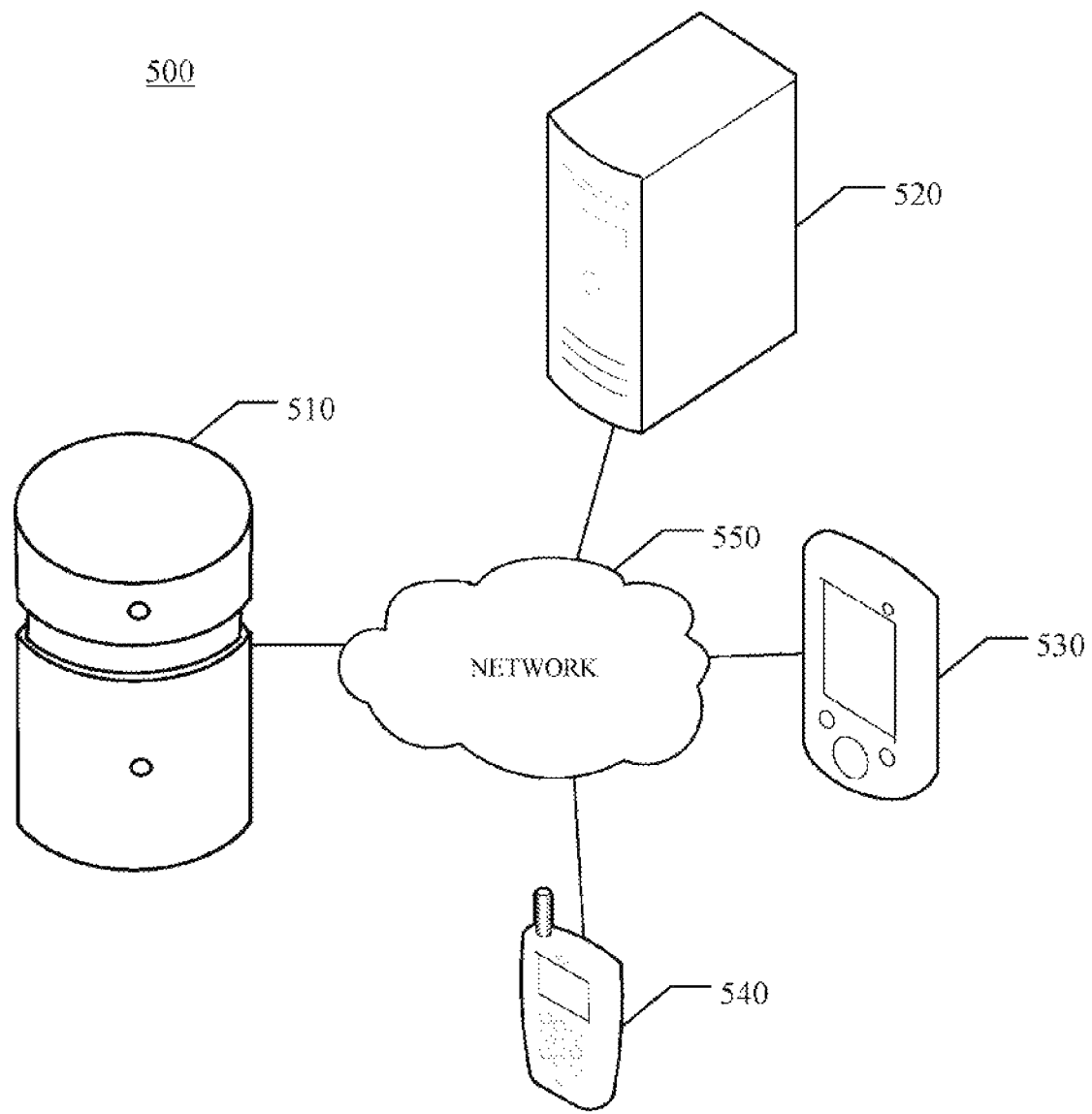
FIG. 5 illustrates an exemplary environment in which an input/output apparatus according to an embodiment of the disclosure is applicable.

FIG. 5 shows an exemplary environment 500 in which an input/output apparatus according to an embodiment of the disclosure is applicable. As shown in FIG. 5, the exemplary environment 500 comprises an input/output apparatus 510 according to an embodiment of the disclosure and various types of electronic devices. The electronic devices may be conventional computers, entertainment apparatus, mobile devices (including personal digital assistance (PDA) and mobile phones etc.) and the like. These electronic devices may have or not have an input/output apparatus. As an example, FIG. 5 shows a computer 520 without an input/output apparatus, a personal digital assistant (PDA) 530 and a mobile phone 540 with a small-sized input/output apparatus.

The input/output apparatus 510 communicates with the electronic device through a network 550. The network 550 can support wired connection, wireless connection or their combinations, for attaching the input/output apparatus 510 to the electronic device to serve as its I/O device.

In some embodiments, when the electronic device has its own input/output apparatus, it may allow a user to switch freely between its own input/output apparatus and an attached input/output apparatus according to embodiments of the disclosure. For example, when a user of a mobile phone 540 wants to view content on a larger screen or input with a larger keyboard, he/she can switch to employ the input/output apparatus 510 to perform input/output after connecting the mobile phone 540 to the input/output apparatus 510.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Further, unless specified otherwise, "first," "second," and/or the like are not intended to imply a temporal aspect, a spatial aspect, an ordering, etc. Rather, such terms are merely used as identifiers, names, etc. for features, elements, items, etc.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

The invention claimed is:

1. An electronic device for providing an input/output interface comprising:
   an input/output controller configured to generate a first projection signal for an output interface and a second projection signal for an input interface;
   a first projector configured to project the output interface according to the first projection signal;
   a second projector configured to project the input interface according to the second projection signal, wherein the input interface comprises a virtual keyboard for use by the electronic device, and the virtual keyboard comprises all keys on a keyboard of a personal computer; and
   a detector configured to detect an input signal in the projected input interface, and transmit the detected input signal to the input/output controller as an input signal for the electronic device;
   wherein the input/output controller is further configured to generate different second projection signals based on different applications running on the electronic device, and virtual keyboards projected according to said different second projection signals comprise keys dedicated to respective applications and changed with applications currently running on the electronic device;
   wherein the second projector is configured to render, in response to running of a first application on the electronic device, one or more functional keys dedicated to the first application in the projected input interface in addition to the keys on the keyboard of the personal computer while rendering all keys on the keyboard of the personal computer in the projected input interface;
   wherein the electronic device further comprises a connector mechanism configured to connect the first projector and the second projector;
   wherein a body of the electronic device is divided into a first part and a second part, and the first projector is arranged in the first part, and the second projector is arranged in the second part, and
   wherein the connector mechanism connects the first part and the second part in an axial direction thereof, and is configured such that a position of the first part is locked relative to the second part when the first part is depressed toward the second part in the axial direction, and the first part is enable to rotate relative to the second part when the first part is raised relative to the second part in the axial direction.

2. The electronic device according to claim 1, wherein the connector mechanism further enables the first projector and the second projector to rotate relative to each other, so as to change a relative projection direction of the projected output interface with respect to the projected input interface.

3. The electronic device according to claim 2, wherein the connector mechanism is configured to automatically rotate at least one of the first projector and the second projector according to an operating mode selected from the multiple operating modes, so as to project the output interface and the input interface according to a corresponding relative projection direction.

4. The electronic device according to claim 3, wherein:
   the detector is configured to detect an operating mode selected by a user, and transmit the detected operating mode selected by the user to the input/output controller;
   the input/output controller is configured to generate a control signal indicating a relative projection direction of the first projector with respect to the second projector based on the selected operating mode, and transmit the control signal to the connector mechanism; and
   the connector mechanism is configured to rotate at least one of the first projector and the second projector according to the relative projection direction indicated in the control signal.

5. The electronic device according to claim 4, wherein the input/output controller is configured to establish and store a table indicative of mapping between operating modes and relative projection directions of the first projector with respect to the second projector, or derive the relative projection directions of the first projector with respect to the second projector based on identifiers of the operating modes.

6. The electronic device according to claim 1, wherein the first projector and the second projector are configured to project the output interface and the input interface according to their respective projection parameters, and the electronic device further comprises an ambient light sensor configured to sense ambient light brightness of the ambient where the electronic device locates, the sensed ambient light brightness being used for adjusting a projection parameter of the first projector and the second projector.

7. The electronic device according to claim 1, wherein the first projector and the second projector are configured to project the output interface and the input interface according to their respective projection parameters, and the electronic device further comprises a touch control sensor module, configured to sense strength of user touch in a touch area, the sensed strength being used for adjusting a projection parameter of the first projector and the second projector.

8. The electronic device according to claim 1, further comprising a fingerprint identification area, configured to obtain a fingerprint of a user of the electronic device, and authenticate the user based on the fingerprint of the user.

9. The electronic device according to claim 1, wherein the output interface is a virtual screen for use by the electronic device.

10. An input/output method for an electronic device according to claim 1 comprising:
    generating the first projection signal for the output interface and the second projection signal for the input interface;
    projecting the output interface according to the first projection signal through the first projector;
    projecting the input interface according to the second projection signal through the second projector, wherein the input interface comprises the virtual keyboard for use by the electronic device, and the virtual keyboard comprises all keys on a keyboard of a personal computer; and
    detecting the input signal in the projected input interface as the input signal for the electronic device;
    wherein said generating the second projection signal comprises generating different second projection signals based on different applications running on the electronic device, and virtual keyboards projected according to said different second projection signals comprise keys dedicated to respective applications and changed with the applications currently running on the electronic device;

wherein said projecting the input interface comprises rendering, in response to running of a first application on the electronic device, one or more functional keys dedicated to the first application in the projected input interface in addition to the keys on the keyboard of the personal computer while rendering all keys on the keyboard of the personal computer in the projected input interface;

wherein the method further comprises locking the position of the first part relative to the second part by pressing the first part toward the second part in the axial direction of the connector mechanism, and enabling the first part to rotate relative to the second part by raising the first part relative to the second part in the axial direction of the connector mechanism.

11. The input/output method according to claim 10, further comprising relatively rotating the first projector and the second projector through the connector mechanism, so as to change a relative projection direction of the first projector with respect to the second projector.

12. The input/output method according to claim 11, wherein the electronic device has multiple operating modes, and the method comprises: automatically rotating at least one of the first projector and the second projector through the connector mechanism according to an operating mode selected from the multiple operating modes, so as to project the output interface and the input interface according to a corresponding relative projection direction.

13. An input/output apparatus for use with an electronic device comprising:
   a communicator configured to be communicatively connected with the electronic device, and receive a first projection signal for an output interface and a second projection signal for an input interface from the electronic device,
   a first projector configured to project the output interface according to the first projection signal;
   a second projector configured to project the input interface according to the second projection signal, wherein the input interface comprises a virtual keyboard for use by the electronic device, and the virtual keyboard comprises all keys on a keyboard of a personal computer; and
   a detector configured to detect an input signal in the projected input interface;
   wherein the communicator is further configured to transmit the detected input signal to the electronic device; and
   wherein the communicator is further configured to receive different second projection signals generated based on different applications running on the electronic device, and virtual keyboards projected according to said different second projection signals comprise keys dedicated to respective applications and changed with the applications currently running on the electronic device;
   wherein the second projector is configured to render, in response to running of a first application on the electronic device, one or more functional keys dedicated to the first application in the projected input interface in addition to the keys on the keyboard of the personal computer while rendering all keys on the keyboard of the personal computer in the projected input interface;
   wherein the input/output apparatus further comprises a connector mechanism configured to connect the first projector and the second projector;
   wherein a body of the input/output apparatus is divided into a first part and a second part, and the first projector is arranged in the first part, and the second projector is arranged in the second part, and
   wherein the connector mechanism connects the first part and the second part in an axial direction thereof, and is configured such that a position of the first part is locked relative to the second part when the first part is depressed toward the second part in the axial direction of the connector mechanism, and the first part is enable to rotate relative to the second part when the first part is raised relative to the second part in the axial direction of the connector mechanism.

14. The input/output apparatus according to claim 13, wherein the connector mechanism further enables the first projector and the second projector to rotate relative to each other, so as to change a relative projection direction of the projected output interface with respect to the projected input interface.

15. The input/output apparatus according to claim 14, wherein the communicator is configured to receive an operating mode selected from multiple operating modes from the electronic device, and the connector mechanism is configured to automatically rotate at least one of the first projector and the second projector according to the received operating mode so as to project the output interface and the input interface according to a corresponding relative projection direction.

* * * * *